Dec. 17, 1968           HUGH L. DRYDEN, DEPUTY           3,416,988
           ADMINISTRATOR OF THE NATIONAL AERONAUTICS
                    AND SPACE ADMINISTRATION
                 TRAVELING SEALER FOR CONTOURED TABLE
Filed Oct. 20, 1965                                 3 Sheets-Sheet 1

INVENTORS
AUSTIN D. McHATTON
BERT C. DEIS
SIGVARD STENLUND
RICHARD J. SLATER

BY

ATTORNEYS

INVENTORS
AUSTIN D. McHATTON
BERT C. DEIS
SIGVARD STENLUND
RICHARD J. SLATER

ATTORNEYS

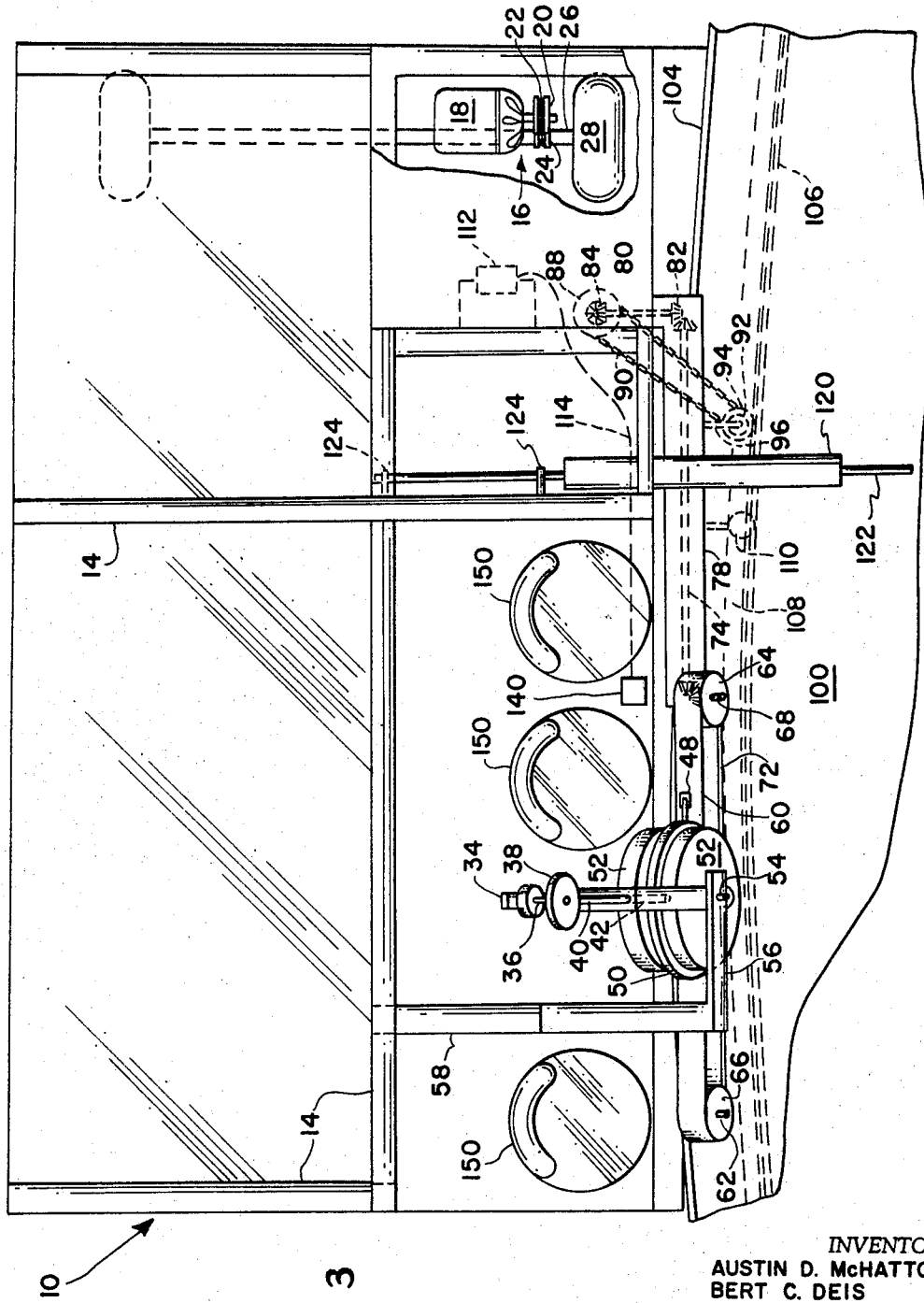

United States Patent Office 3,416,988
Patented Dec. 17, 1968

1

3,416,988
TRAVELING SEALER FOR CONTOURED TABLE
Hugh L. Dryden, deputy administrator of the National Aeronautics and Space Administration with respect to an invention of Austin D. McHatton and Bert C. Deis, Hampton, Va., and Sigvard Stenlund and Richard J. Slater, Northfield, Minn.
Filed Oct. 20, 1965, Ser. No. 499,122
35 Claims. (Cl. 156—545)

The invention described herein may be manufactured and used by or for the Government of the United States of America for governmental purposes without the payment of any royalties thereon or therefor.

This invention relates generally to a sealing apparatus and more particularly to sealing apparatus for joining two elongated pieces of frangible material having longitudinally arcuate edges.

Technological advances in recent years now permit the forming of laminated materials of extremely thin, lightweight material. These thin, yet strong, materials are utilized for construction of items ranging from food packages to space satellites. For example, a laminate material such as aluminum coated Mylar characteristically is able to be folded into relatively small packages and subsequently inflated to form a substantially rigid structure such as a passive communications satellite. However, technological advances have not provided ways of forming these materials into large sheets. Therefore, it is necessary to utilize a plurality of elongated sections when it is desired to form a structure or package requiring a sheet of substantial area.

The prior art contains many machines for sealing two pieces of material together. Such machines include laminating devices having mating belts for putting the two pieces of material into compression while applying heat to form a hermetically sealed joint. It is also known to overlap adjacent pieces of material to be joined, and sliding or drawing a heated element, such as a platen, across the overlap to again form a hermetic seal. When the weight and intactness of the structure or joint are not critical, the cumbersomeness and rough treatment of these machines can be tolerated. However, the necessity for lightweight and airtight seals does not permit the use of many such machines. Further, if the lightweight laminar material is to be maintained in an airtight condition there must be a minimum of handling due to the inherent destructiveness of multiple folds and creases that fatigue and puncture the material. Also these materials are of such a flexibility and so thin that large, bulky and cumbersome machines are incapable of positioning the adjacent pieces of material to be sealed. These problems become even more critical when forming something like a spherical structure wherein gores having arcuate edges are to be secured to one another. Such a construction does not permit the two adjacent pieces of material to be laid adjacent one another and retained in a flat position to provide a neat uniform joint. In these situations extreme care must be used to avoid wrinkles which would cause an imperfect seal.

The difficulties of the prior art are overcome by the instant invention wherein one of the gores is supported outstretched and another is carried on a roll mounted on a carriage which travels along the edge of the support for the outstretched gore. Sealing apparatus is mounted on the carriage to travel along and effect a substantially

2 perfect seal of the two gores on the outstretched gore support.

It is an object of the instant invention to provide a machine for sealing adjacent pieces of frangible material having longitudinally arcuate edges.

Another object of this invention is to provide an apparatus for rapidly sealing thin laminates with a minimum amount of handling.

Still another object of this invention is to provide a machine with supports for frangible material of considerable lengths that is sealed by a hot wheel in compression with an endless belt which are mounted on a carriage that travels along the support while preventing relative motion between the hot wheel surface of the endless belt and the support surface.

A further object of this invention is to provide apparatus for joining adjacent pieces of material wherein a sealing assembly is mounted at an angle on a carriage that travels parallel to the edge of a support at a synchronized rate of movement with the sealing assembly.

An additional object of the instant invention is to provide a traveling sealer for a contoured table capable of sealing adjacent pieces of frangible material with a minimum amount of handling at relatively rapid rates.

Yet another object of this invention is to provide a traveling sealer for a table wherein a sealing assembly has a movement rate synchronized with the movement rate of the sealer to prevent relative movement between the surface of the table and the portion of the sealing assembly upon which the seal is made.

Generally, the foregoing and other objects are accomplished by mounting an electrically heated wheel in contact with an endless belt on a self-propelled carriage which travels along a table having an edge substantially conforming to the arc of the gores to be sealed. A friction rail, mounted on the vertical edge of the table, is contacted by a takeoff cylinder mounted on the carriage which is connected by a plurality of shafts and gears to function as the power drive for the endless belt which, therefore, is synchronized to prevent relative movement between the upper surface thereof and the table surface upon which one of the gores is supported. As one gore is unrolled from the gore roll mounted on the carriage, it is fed onto the endless belt in abutting relation to the relatively stationary gore and a tape from a tape dispenser mounted above the hot wheel is fed down to overlay the joint and effect the seal.

A more complete appreciation of the invention and many of the attendant advantages thereof will be readily apparent as the same becomes better understood by reference to the following detailed description when considered in connection with the accompanying drawings, wherein:

FIG. 3 is a schematic plan view, with portions omitted for clarity, of an embodiment of this invention.

Figure 1:
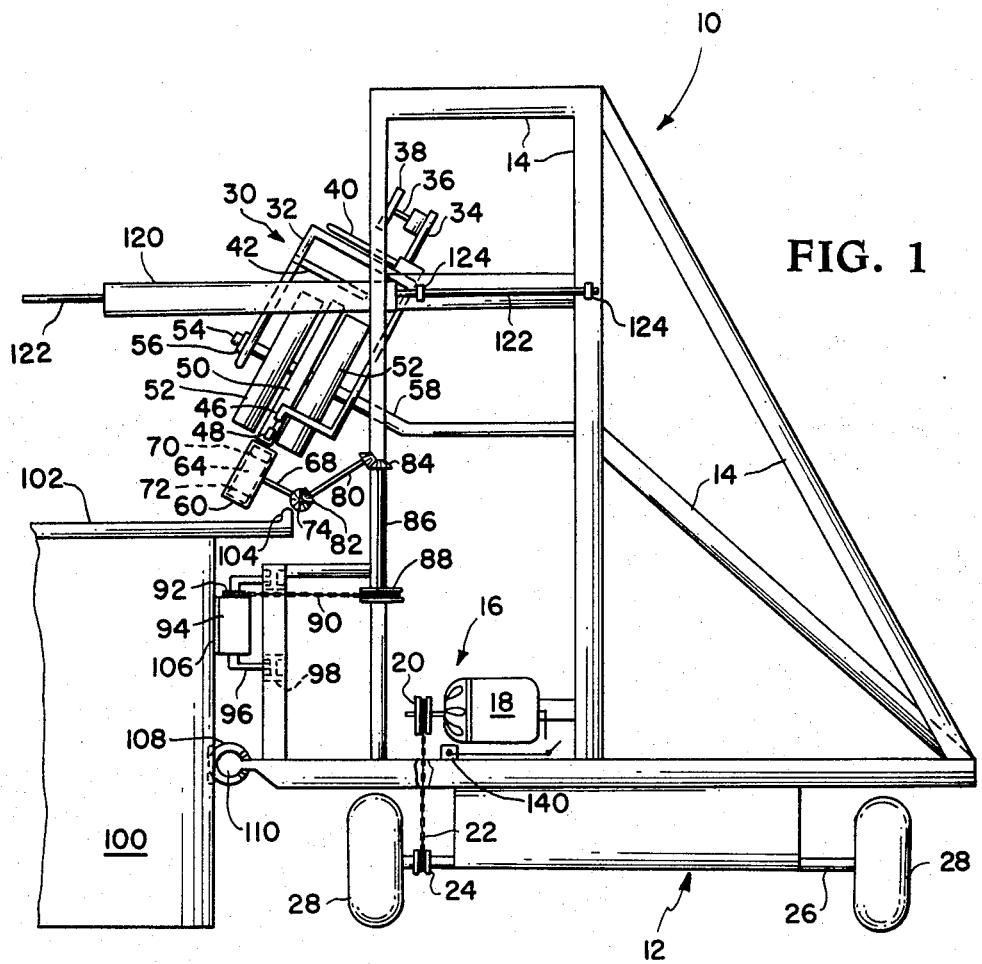
FIG. 1 is an end elevational schematic view of the instant invention.

Referring now to the drawings wherein like reference numerals designate identical or corresponding parts throughout. Carriage 10 is shown as comprising an undercarriage or chassis 12 and a framework 14 that supports sealing assembly 30, to be more fully described hereinafter. Carriage 10 is propelled by a power system including motor 18 having a sprocket 20 to which chain 22 is attached. Chain 22 runs from sprocket 20 around sprocket 24 on axle 26 of chassis 12. Carriage 20 is supported on balloon type tires or wheels 28 able to withstand high pressures as will be more fully described hereinafter.

Figure 2:
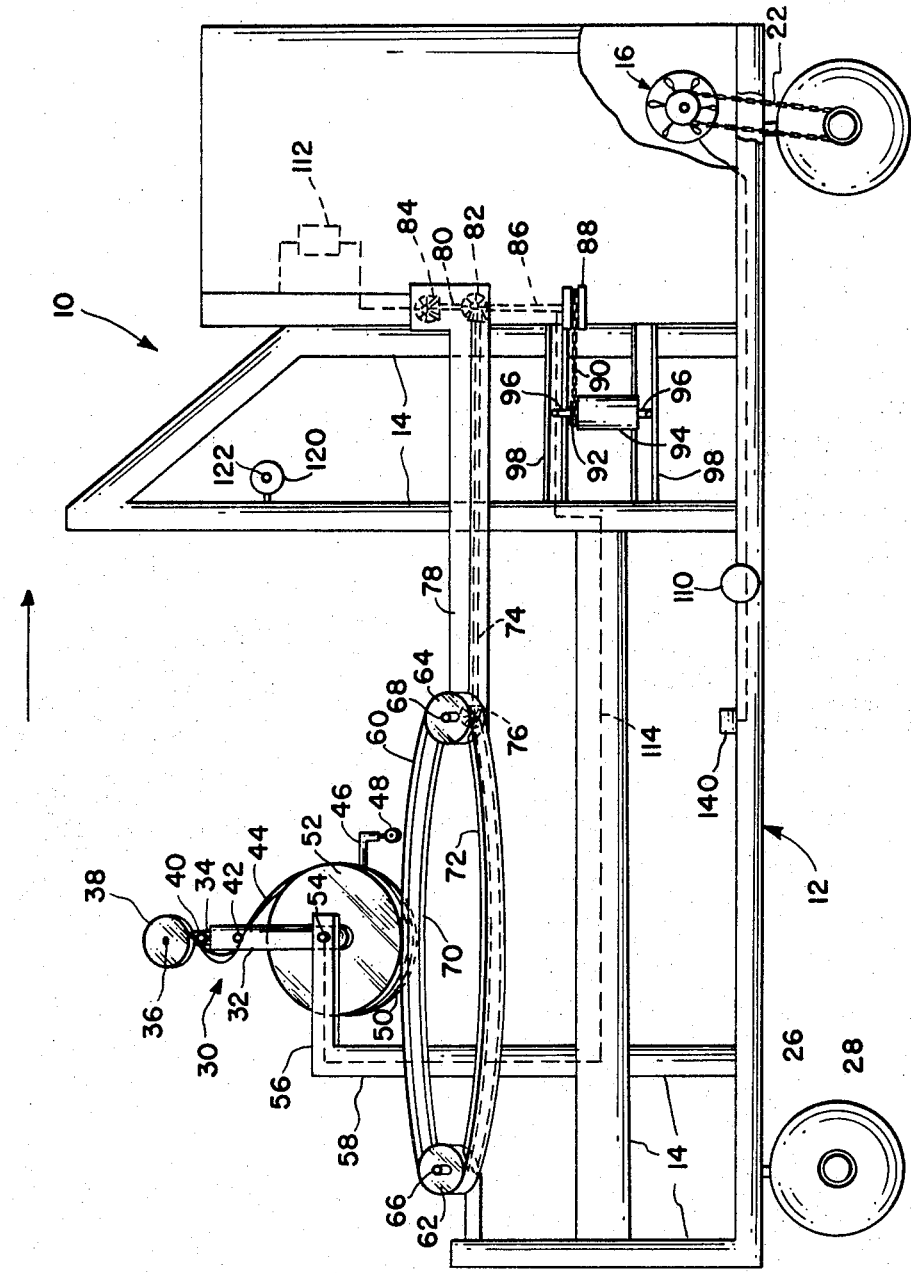
FIG. 2 is a side elevational schematic view of the carriage assembly of the traveling sealer of the instant invention.

As indicated hereinabove sealing assembly 30 is mounted upon carriage 10 and supported by framework 14 at an angle of about 35 to 55 degrees from the vertical. Inverted U-shaped bracket 32 is rigidly secured to framework 14 and supports member 34 from which axle 36 extends to provide a bearing support for tape reel 38 and thereby form a dispensing mechanism from which tape 44 (FIG. 2) is fed about rotating guides 40 and 42 and onto hot wheel 50. To assist the operator in locating, by indicating the necessary overlap and to preliminarily join the two pieces of material on endless belt 60, a roller support 46 is rigidly attached to bracket 32 and supports adjustable roller 48.

Hot wheel 50 is protected by safety covers or protectors 52 all of which are mounted on axle 54 which is journaled on framework 56. Axle 54 and U-shaped bracket 32 are supported from frame member 58 which also comprises a portion of framework 14. Hot wheel 50 is heated by electrical resistors inside thereof and which obtain current by conventional means, such as slip rings or brushes (not shown), from cable 114 (FIG. 2) extending from hot wheel 50 to a thermostat or temperature regulator 112 that is controlled manually.

Figure 4:
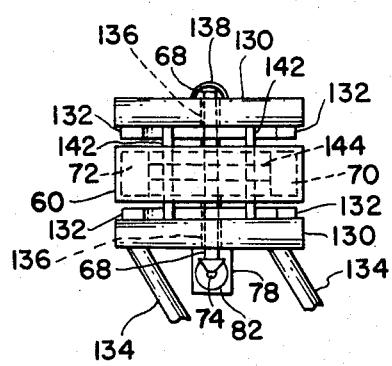
FIG. 4 is a schematic detail view of a portion of the invention.

Hot wheel 50 is in compressive contact with endless belt 60 mounted on end cylinders or wheels 62 and 64 which in turn are respectively mounted for rotation on axles 66 and 68. Axle 68 is attached to drive wheel 64 for powering and rotating belt 60 and is connected to a drive train as will be described hereinafter. In order to protect wheels 62 and 64 as well as belt 60 and platens 70 and 72, and further to function as supports for those elements, cover plates 130, reinforced by members 132, (FIG. 4) are rigidly attached to frame members 134 which extend to and form part of framework 14 on carriage 10. Since idler wheel 62 does not require connection to a power drive shaft it could be mounted on axle 66 by some kind of bearing with axle 66 rigidly attached to cover plates 130 or, in the alternative, axle 66 could be secured to either wheel 62 and bearings 136 provided for enabling frictionless rotation of axle 66. Since axle 68 is attached to drive wheel 64, it becomes necessary to provide bearings 136 for frictionless support of axle 68 by cover plates 130.

The gear train for powering drive wheel 64 includes drive shaft 74 which is connected to axle 68 by worm gears 76. Shaft 74 is in turn connected, by gears 82, to shaft 80 which is connected to shaft 86 by gears 84. Shaft 86 has sprocket 88 mounted thereon which meshes with chain 90 extending to sprocket 92 mounted on takeoff cylinder 94. Cylinder 94 is secured to I-beams 98 of framework 14 by cylinder mounts or axles 96. Axle 68, drive shafts 74 and 80 and gears 76 and 82 are protected by housing 78 (FIG. 2) which is secured to framework 14 and cover plate 130, to be described subsequently. Housing 78 may be provided with shaft supports having bearings, not shown, as is necessary and functions as a protection for the material being sealed.

Upper platen 70 and lower platen 72 assist in preventing belt 60 from being deformed by hot wheel 50 or other forces which might act thereagainst. It is to be understood that platens 70 and 72 could also be heated to provide a higher temperature for belt 60 which in some circumstances would assist in effecting a better seal between the two pieces of material and shape. Platens 70 and 72 are supported by any conventional framework, for example, vertical members (not shown) that are secured to horizontal members that in turn are secured to cover plates 130. In the event that platens 70 and 72 are required for adding heat to belt 60 they may be constructed for conventional electronically heated elements that could be connected to manual control 112 by wires 114 being provided with a second leg to extend to both the platens 70 and 72 while the primary leg would connect with hot wheel 50.

Gore roll 120 is rotatably mounted on shaft 122 which extends outwardly and is supported by framework 14 to which it is attached by brackets 124. It is to be understood that since gore roll 120 or shaft 122 must necessarily rotate, there should be a frictionless rotary connection therebetween or brackets 124 should be provided with some type of bearing to permit rotation of both shaft 122 and gore roll 120. Due to the shape of the gores, it is advantageous to have shaft 122 of greater length than roll 120 to permit the latter to reciprocate so the edge of the gore on roll 120 is always located above and in line with its sealing position on belt 60. In this way the gore on roll 120 is easily pulled from the roll and placed in position to be sealed at the rate of forward movement of the carriage 10.

Table 100, see FIG. 1, is generally of conventional construction having horizontal support surface 102 provided with an overhang and built-up edge 104. When the pieces of material to be joined have arcuate edges, as in the instant case being described, table edge 104 could be of arcuate configuration to conform to the arcuate edge of the piece of material lying on the table surface 102. Friction rail 106 is mounted on the vertical edge of table 100 at any convenient location so as to be contacted by takeoff cylinder 94 to drive wheel 64 of belt assembly 60.

Track or guide 108 also is rigidly secured to the vertical edge of table 100, preferably below friction rail 106. Guide 110 fits within rail 108 and is rigidly secured to undercarriage or chassis 12 of carriage 10. Track 108 and guide 110 form a positive connection between carriage 10 and table 100 and provide positive abutment of takeoff cylinder 94 and friction rail 106. Although shown as having a single guide 110, see FIG. 2, it is to be understood that under certain circumstances it may be advantageous to add a plurality of guides 110 for an interfitting connection with track 108. It has been found that a substantially cylindrical track 108 and a substantially spherical guide 110 perform efficiently as the connection between carriage 10 and table 100. As indicated hereinabove, wheels 28 must be capable of withstanding high pressures. Such high pressures prevent lowering of carriage 10 when additional weight is supported thereby and permit a uniform and substantially horizontal mating of track 108 and guide 110, as well as a positive connection between friction rail 106 and takeoff cylinder 94.

As best seen in FIG. 3, carriage 10 is provided with a plurality of seats 150 for the operator and persons performing tasks necessary for proper alignment of the gores and tape. Foot control 140 provides a signal for governing the rate of power supplied by power system 16 without requiring distraction of the operator from the sealing activity.

*Operation*

The instant invention is primarily adapted for joining together two pieces of laminar frangible material such as Mylar. The traveling sealer is especially useful for joining gores of substantial length and having arcuate edges. For example, in construction of the 135-foot diameter Echo II type passive communications satellite, it is necessary to seal each edge of approximately one hundred and six gores and then apply end covers to the system to join the substantially pointed ends of the gores. In order to form such a structure a gore (not shown) is laid lengthwise along table 100 with one arcuate edge adjacent table edge 104. A second gore is rolled onto some type of support cylinder and mounted on shaft 122 on carriage 10 which has guide 110 inserted into track 108 at one end thereof. Power system 16 is started and, as carriage 10 begins to move, the gore on roll 120 is fed onto belt 60 as is the gore from table surface 102. Proper location of the gores to be sealed is accomplished by folding the gore lying on table top 102 so the outer edge thereof that is on top conforms to arcuate edge 104. This top edge is then raised between belt 60 and carriage 10 and curved into position on belt 60 in front of hot wheel 50. The gore on roll 120 is positioned in abutting relationship to the edge of the gore previously located and adjustable roller 48 set on the abutting edges of the two gores. Thus it is seen that the gores are manually brought together in abutting relation on belt 60 and adjustable roller 48 retains them in position as the gores are fed under hot wheel 50. Sealing tape 44 is dispensed from above hot wheel 50 and fed around rotatable guides 40 and 42 so that, as wheel 50 is rotated, because of its compressive contact with endless belt 60, tape 44 is centered and joined to each of the two pieces and a hermetic seal effected that is both uniform and airtight with substantial structural strength.

As traveling sealer or carriage 10 moves along the floor with guide 108 in track 110, takeoff cylinder 94 contacts friction rail 106 and is forced to rotate, thereby rotating sprockets 92 and 88 which are interconnected by chain 90. The gear train comprised of shafts and gears 68–86 is positively connected to sprocket 88 and drive wheel 64. Thus it is seen that as sprocket 88 is rotated by chain 90, it in turn rotates shaft 86 and its attendant gears 84 that drive and rotate shaft 80 that in turn acts with gears 82 to drive shaft 74 which is connected to axle 68 by gears 76. It is readily apparent that, depending upon the circumstances involved, proper design of sprockets 92 and 88 and wheel 64 will permit belt 60 to be rotated so the upper surface moves at the same speed as carriage 10 to thereby provide synchronized movement, that is, preventing relative movement between the upper surface of belt 60 and table top 102. Such synchronization of movement is advantageous in that it prevents the gore outstretched on table top 102 and the gore on roll 120 from becoming longitudinally displaced with respect to one another and avoids establishing unnecessary stresses in the edges of the gores and the tape joining them.

When a complete seal has been made and the two pieces of material are secured to one another, the carriage is stopped and tape 44 is cut. Takeoff cylinder 94 is disengaged from contact with friction rail 106 by conventional means, not shown, and carriage 10 is returned to the end of the table from which it started and another seal may be initiated.

It is readily apparent that in a situation where the plurality of pieces of material are being connected that there would be at this point a minimum of two pieces of material that had been joined outstretched on table top 102. Thus, it is merely necessary to position another gore roll 120 on shaft 122 and orient the material on table top 102 to the endless belt 60 and also position the gore from roll 120 onto endless belt 60. Repetition of these cycles of longitudinally sealing the adjacent gores is continued until the completed structure is accomplished.

Endless belt 60 and hot wheel 50 are mounted on carriage 10 at an angle, preferably in the range of 35–55 degrees to the vertical and extend over table top 102, FIG. 1. Therefore, it is unnecessary to handle either of the gores with more than a minimum amount of contact. The moving and handling of the sealed gores is greatly reduced and accordingly there are less wrinkles, holes, and manpower involved to provide easier folding. Further, the angular relationship and location of sealing assembly 30 and belt assembly 60 permits location thereof immediately adjacent arcuate edge 104 of table top 102 to again reduce the amount of manual handling and movement of the pieces of material being joined. Location of foot control 140 for drive mechanism 16 permits the operator to control the speed of traveling sealer or carriage 10 without removing his hands from the pieces of material being joined. The efficiency of the sealer may be enhanced by heating upper and lower platens 70 and 72, respectively, to heat belt 60 and thereby provide heat from both sides of the material and the tape being joined to effect a more uniform and structurally strong joint.

Obviously many modifications and variations of the subject invention are possible in the light of the above teachings. It is therefore to be understood that within the scope of the appended claims the invention may be practiced otherwise than as specifically described.

What is claimed as new and desired to be secured by Letters Patent of the United States is:

1. In a machine for securing two pieces of material the combination comprising: carriage means for transporting one of the pieces of material and the equipment for sealing the pieces together; support means for a second piece of material; sealing means for applying and securing the adjacent edges of the material; belt means for cooperative action with said sealing means and supporting the two pieces of material with their adjacent edges abutting one another; and means for rotating said belt means.

2. The sealing machine of claim 1 wherein the carriage has power means for movement thereof and guide means for interconnection with said support means.

3. The sealing machine of claim 2 wherein the power means is comprised of a power source having a sprocket that connects with a sprocket on the wheels of the carriage by a link chain to provide power for the carriage.

4. In a machine for securing adjacent pieces of material the combination comprising: carriage means for transporting the equipment; a table for supporting one of the pieces of material and a material roll mounted on said carriage for supporting the second piece of material; sealing means for securing adjacent edges of the pieces of material to be joined; belt means for cooperative action with said sealing means; and drive means for rotating said belt means.

5. The sealing machine of claim 4 wherein said table has a friction rail and a track for mating with said carriage; and said material roll reciprocates to compensate for variations in width of the pieces of material to be joined.

6. In a machine for sealing adjacent pieces of material the combination comprising: carriage means for transporting equipment; support means for the material; sealing means for securing the adjacent edges of the material to be joined; belt means synchronized with the movement of said carriage to prevent relative movement of said support means and the upper surface of the belt means; and drive means for rotating said belt means.

7. The sealing machine of claim 6 wherein said belt means comprises an endless belt mounted on said carriage means at an angle so as to extend over said support means and having a drive wheel at one end and a free wheel at the other end with top and bottom platens extending therebetween.

8. In a sealing machine the combination comprising: carriage means for transporting equipment; support means for supporting the material to be joined; sealing means for securing the adjacent edges of the material; belt means for cooperative action with said sealing means; and a positive drive for said belt means having a gear train connecting said belt to takeoff means in juxtaposition to said support means.

9. The sealing machine of claim 8 wherein said positive drive has gears connecting a plurality of shafts forming a drive train having one end connected to said belt means with a sprocket on the other end that meshes with a chain mated to a sprocket on a takeoff cylinder mounted on said carriage in contact with said support means.

10. A sealing machine comprising: carriage means for transporting equipment; support means for supporting material to be joined; a hot wheel mounted on said carriage to extend over said support means; tape means mounted with said wheel to provide tape for securing adjacent edges of the material to be sealed; belt means for cooperative action with said hot wheel and tape means; and drive means for rotating said belt means.

11. The sealing machine of claim 10 wherein said hot wheel is at an angle to said carriage with protectors on each side thereof; said tape means mounted above said hot wheel; a roller for positioning and setting said tape on the adjacent edges of the material to be sealed; means for heating and temperature control of said hot wheel; and said hot wheel heated and temperature controlled electrically.

12. In a sealing machine the combination comprising: carriage means having power means for moving the carriage and guide means for interconnection with a table; support means including a table and a material roll; a hot wheel mounted on said carriage to extend over said table; tape means mounted with said wheel to provide tape for securing adjacent edges of the material to be joined; belt means synchronized with the movement of said carriage means to prevent relative movement of the table surface and upper surface of said belt; and positive drive means for said belt having a gear train connecting said belt to a takeoff means in juxtaposition to said table.

13. In a sealing machine for joining two pieces of material the combination comprising: carriage means for transporting equipment; a table for support of one of the pieces of material; a material roll mounted on said carriage means for support of the second piece of material; belt means synchronized with the movement of said carriage to prevent relative movement of the table surface and the upper surface of the belt; positive drive for said belt means having a gear train connecting the belt to takeoff means in juxtaposition to said table; a hot wheel mounted on said carriage to extend over said table; and tape means mounted with said wheel to provide tape for securing the adjacent edges of the material to be joined.

14. The sealing machine of claim 13 wherein said carriage is wheeled and moved with positive power; and guide means for interconnection with said table.

15. In a machine for sealing adjacent edges of gores for constructing a substantially spherical member, the combination comprising: a carriage having power means for movement thereof and guide means for interconnection with a table; support means for the material including a table; belt means synchronized with the movement of said carriage to prevent relative movement of the table surface and the upper surface of said belt means; positive drive for said belt means having a gear train connecting the belt to takeoff means in a juxtaposition to said table; a hot wheel mounted at an angle on said carriage to extend over said table; tape means mounted with said wheel to provide tape for securing the adjacent edges of the material to be joined.

16. The sealing machine of claim 15 wherein said table has a friction rail for contact with said takeoff means and a track for connection with said guide means; and said support means includes a reciprocating gore roll.

17. In a sealing machine for joining adjacent pieces of material having arcuate edges the combination comprising: a carriage having power means for movement thereof and guide means for interconnection with a table; a table and material roll for supporting the pieces of material to be joined; sealing means including a hot wheel mounted on said carriage to extend over said table and tape means mounted with said wheel to provide tape for securing the adjacent edges of the material; belt means for cooperative action with said sealing means; and a positive drive for said belt means having a gear train connecting said belt means to takeoff means in juxtaposition to said table.

18. The sealing machine of claim 17 wherein said belt means comprises an endless belt mounted on said carriage at an angle to extend over said table and having a drive wheel at one end and a free wheel at the other end with top and bottom platens extending therebetween.

19. A sealing machine for securing two gores of a substantially spherical member comprising: support means including a table and gore roll; a carriage having power means for movement thereof and connecting means for interconnection with said support means; belt means synchronized with the movement of said carriage to prevent relative movement of the table surface and the upper surface of said belt means; drive means for rotating said belt means including a gear train connecting said belt means to takeoff means in juxtaposition to said table; and sealing means including a hot wheel mounted on said carriage to extend over said table with tape means mounted above said wheel to provide tape for securing adjacent edges of the material to be joined whereby a complete seal is effected between the gore on the table and the gore dispensed from the gore roll at a rapid rate with a minimum of handling of and damage to the gores.

20. The sealing machine of claim 19 wherein said drive means comprises gears connecting a plurality of shafts forming a drive train having one end connected to a drive wheel of said belt means with a sprocket on the other end that meshes with a chain mated to a sprocket on a takeoff cylinder mounted on said carriage in contact with said table.

21. A sealing machine comprising: a carriage having power means for movement thereof and guide means for interconnection with a table; support means including a table and material roll support; belt means synchronized with the movement of said carriage to prevent relative movement of the table surface and the upper surface of said belt means; positive drive for said belt means having a gear train connecting said belt means to takeoff means in juxtaposition to said table; and sealing means for applying securing the tape on adjacent edges of the material to be joined.

22. The sealing machine of claim 21 wherein said sealing means comprises a hot wheel mounted at an angle on said carriage to extend over said table and having protectors on each side thereof; tape dispensing means above said hot wheel; a roller for positioning and setting said tape; means for heating and temperature control of said hot wheel; and said hot wheel heated and temperature controlled electrically.

23. A machine for sealing two gores together comprising: a table having a friction rail along one vertical edge thereof above a track; a wheeled carriage with positive power and a guide for interconnection with said track; a reciprocating gore roll mounted on said carriage; an endless belt substantially parallel to and mounted on said carriage at an angle to extend over said table and having a drive wheel at one end and an idler wheel at the other end with top and bottom platens extending therebetween; a positive drive having gears connecting a plurality of shafts forming a drive train having one end connected to said drive wheel with a sprocket on the other end that meshes with a chain mated to a sprocket on a takeoff cylinder mounted on said carriage in contact with said friction rail; a hot wheel mounted on said carriage at substantially the same angle as said belt to extend thereover and come in contact therewith; protectors on each side of said hot wheel; a tape dispenser above said hot wheel; a roller for positioning and setting the tape dispensed from said tape dispenser; means for heating and temperature control of said hot wheel; and said hot wheel heated and temperature controlled electrically.

24. The sealing machine of claim 23 wherein the edge of said tabel adjacent said carriage is contoured to substantially conform to the edge configuration of one of said gores.

25. In a sealing machine the combination comprising: carriage means for transporting equipment; a table having a friction rail along one vertical edge thereof and a track positioned below said friction rail; a reciprocating gore roll mounted on said carriage to extend over said table thereabove; an endless belt mounted on said carriage at an angle to extend over said table and having a drive wheel at one end and a free wheel at the other end with top and bottom platens extending therebetween; a positive drive having gears connecting a plurality of shafts forming a drive train having one end connected to said drive wheel with a sprocket on the other end that meshes with a chain mated with a sprocket on a takeoff cylinder mounted on said carriage means in contact with said friction rail; a hot wheel mounted on said carriage at substantially the same angle as said belt to extend over said table; protectors on each side of said hot wheel; tape dispensing means above said hot wheel; a roller for positioning and setting the tape; and means for electrical heating and temperature control of said hot wheel.

26. The sealing machine of claim 25 wherein said carriage has wheels and is driven by positive power and a guide extends from one side thereof for connection with said track.

27. In a machine for sealing adjacent pieces of material, the combination comprising: a wheeled carriage with positive drive and a guide; support means for supporting the pieces of material to be joined; an endless belt mounted on said carriage at an angle to extend over said support means and having a drive wheel on one end and a free wheel at the other end with top and bottom platens extending therebetween; a positive drive having gears connecting a plurality of shafts forming a drive train having one end connected to said drive wheel of said belt with a sprocket on a takeoff cylinder mounted on said carriage in contact with said support means; a hot wheel mounted at an angle on said carriage with protectors on each side thereof; tape dispensing means above said hot wheel; a roller for positioning and setting the tape on adjacent edges of the material to be joined; and means for electrically heating and temperature control of said hot wheel.

28. The machine of claim 27 wherein said support means includes a table and a material roll support.

29. In a sealing machine the combination comprising: a wheeled carriage with positive power and guide means for interconnection with a table; a table having a friction rail on one vertical edge thereof and a substantially parallel track below said friction rail; a reciprocating gore roll mounted on said carriage; a hot wheel mounted at an angle on said carriage to extend over said table; protectors on each side of said hot wheel; tape dispensing means above said hot wheel; a roller for positioning and setting the tape; means for electrically heating and temperature control of said hot wheel; belt means for cooperative action with said hot wheel and roller; a positive drive having gears connecting a plurality of shafts forming a drive train having one end connected to said belt means with a sprocket on the other end that meshes with a chain mated to a sprocket on a takeoff cylinder mounted on said carriage in contact with said friction rail.

30. The machine of claim 29 wherein said belt means are synchronized with the movement of said carriage to prevent relative movement of the table surface and the upper surface of said belt means.

31. In a sealing machine the combination comprising: a table having a friction rail on one vertical edge thereof and a substantially parallel track below said friction rail; a wheeled carriage with positive power and guide means for interconnection with said table; a reciprocating gore roll mounted on said carriage; an endless belt mounted on said carriage at an angle to extend over said table and having a drive wheel at one end and an idler wheel at the other end with top and bottom platens extending therebetween; drive means for rotating said drive wheel; a hot wheel mounted at an angle on said carriage in juxtaposition to said belt means with protectors on each side of said hot wheel; tape dispensing means above said hot wheel; a roller for positioning and setting the tape; and means for heating and temperature control of said hot wheel.

32. The sealing machine of claim 31 wherein the drive means includes positive drive for the drive wheel of said endless belt including a gear train connecting said drive wheel to a takeoff means in juxtaposition to said friction rail.

33. In a sealing machine the combination comprising: a table having a friction rail and a substantially parallel track below said friction rail; a wheeled carriage with positive power and a guide for interconnection with said track on said table; a reciprocating gore roll mounted on said carriage above said table; an endless belt mounted on said carriage at an angle to extend over said table and having a drive wheel at one end and a free wheel at the other end with top and bottom platens extending therebetween; positive drive means having gears connecting a plurality of shafts forming a gear train having one end connected to said drive wheel of said belt with a sprocket on the other end meshed with a chain mated to a sprocket on a takeoff cylinder mounted on said carriage in contact with said friction rail; and sealing means for applying and securing tape to the adjacent edges of material to be joined.

34. The sealing machine of claim 33 wherein said sealing means comprises a hot wheel mounted on said carriage to extend over said belt; tape dispensing means mounted above said wheel to provide the tape for securing adjacent edges of the material to be joined; and said hot wheel being adapted to contact the tape whereby as the carriage moves along the table causing the takeoff cylinder to actuate the gear train and rotate the belt the hot wheel is rotated to heat the tape and adjacent edges of the material to effect a strong, airtight seal.

35. In a machine for securing two pieces of fragile material having an arcuate edge and substantial length, the combination comprising:
a table having a support surface and an edge;
a channel member forming a track secured on said edge;
a friction rail secured on said table edge;
a wheeled carriage having positive power means and a guide mounted in said track;
a power takeoff cylinder mounted on said carriage in juxtaposition with said friction rail;
a first sprocket attached to said cylinder and connected to a second sprocket by a drive chain;
a plurality of shafts and gears connected to said second sprocket and forming a gear train;
an endless belt positively mounted on a pair of wheels mounted on said carriage;
one of said pair of wheels connected to one of said plurality of shafts in said gear train to cause synchronous movement of said belt and said cylinder to prevent relative movement of said belt and said support surface when said carriage is in motion;
a pair of platens extending between said wheels in supporting relationship to the inside of said endless belt;
an electrically heated hot wheel mounted in juxtaposition with the upper surface of said endless belt on a framework secured to said carriage;
said belt and hot wheel mounted at an angle to said table support surface;
a pair of insulating protectors attached to said framework on each side of said hot wheel;
a tape reel and tape guides secured to said framework for presenting sealing tape to the belt in proper position;

an axle mounted on said carriage above the height of said horizontal support surface;

an axially movable gore roll mounted on said axle;

a locator roller mounted on said framework forward of said hot wheel to position and hold the adjacent pieces of material to be joined in place on said belt;

whereby a piece of material may be unrolled from said gore roll and positioned with one edge on said belt and a second piece of material which is to be joined thereto and is supported on said support surface may be positioned adjacent thereto and a tape applied over the joint of said pieces of material as said hot wheel passes thereover.

References Cited

UNITED STATES PATENTS 3,269,884   8/1966   Slater _____ 156—57

DOUGLAS J. DRUMMOND, *Primary Examiner.*

U.S. Cl. X.R.

156—577, 583